United States Patent Office
3,741,891
Patented June 26, 1973

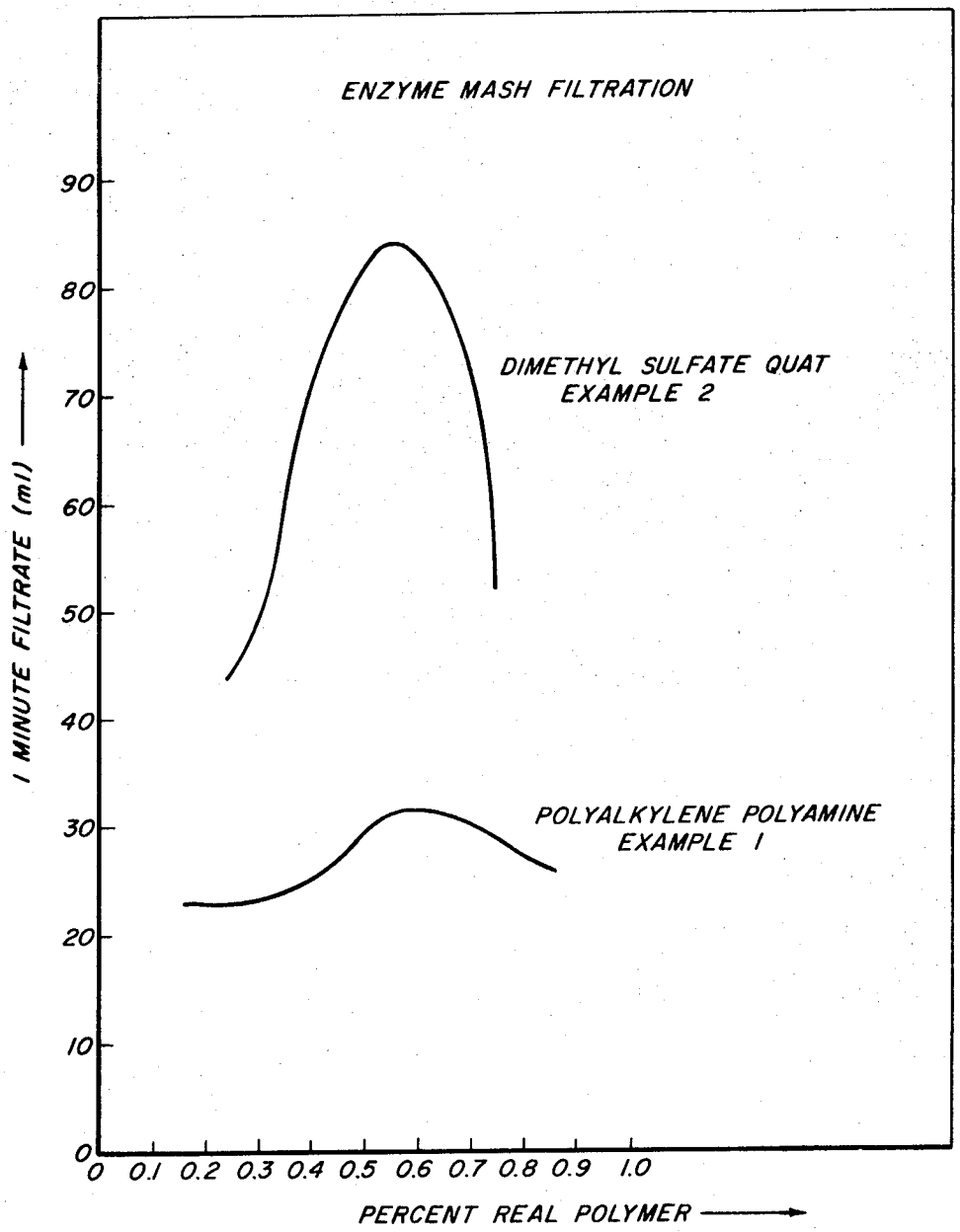

3,741,891
POLYQUATERNARY FLOCCULANTS AND PROCESSES OF PREPARING THEM BY QUATERNIZING ALKYLENE POLYAMINE RESIN POLYMERS FROM EPIHALOHYDRIN AND MONOALKYLAMINES
Hans Peter Panzer and Robert Rabinowitz, Stamford, Conn., assignors to American Cyanamid Company, Stamford, Conn.
Original application Feb. 16, 1971, Ser. No. 115,557. Divided and this application Feb. 19, 1971, Ser. No. 117,032
Int. Cl. C02b 1/20
U.S. Cl. 210—54          8 Claims

ABSTRACT OF THE DISCLOSURE

The cationic flocculant obtained by reacting a monoalkylamine, such as monomethylamine, with an epihalohydrin, such as epichlorohydrin, is quaternized with quaternizing agents, such as dimethyl sulfate, methyl chloride, ethylene oxide, and the like, producing a polyquaternary polymer. The polymer shows improved flocculating power in flocculating aqueous dispersions, such as raw river water, digestion liquors from ilmenite and sulfuric acid, enzyme mashes, sewage flocculation, sewage sludge dewatering, and the like. The polymers are also useful in systems which contain chlorine, such as chlorinated river water, as the quaternary groups are substantially non-reactive with chlorine.

---

This is a division application of U.S. patent application No. 115,557, filed Feb. 16, 1971.

RELATED APPLICATIONS AND BACKGROUND OF THE INVENTION

A typical raw material for the products of the present invention is described and claimed in the application of Nagy, Ser. No. 96,192, filed Dec. 8, 1970. The first example will be repeated below as Example 1 of the present specification, and as the flocculant of that example is a very effective flocculant in practical use, it will also be used as a standard test material in the tests of the polyquaternary polymers of the present invention, which are also set out below. The Nagy application is assigned to the assignee of the present invention.

An application of Panzer and Dixon, Ser. No. 115,556 filed Feb. 19, 1971, now abandoned, and also assigned to the assignee of the present invention, describes the production of polyquaternary flocculants by the reaction of a secondary amine, such as dimethylamine, with an epihalohydrin, such as epichlorohydrin, and particularly a reaction product of a mixture of a major amount of the secondary amine and a minor amount of a chain extending polyfunctionalamine. The products produced, particularly those with both kinds of amines, are improved flocculants.

Polyquaternary compounds have been used for flocculation of aqueous dispersions, particularly those containing chlorine, such as treated river water. In the present application the term "aqueous dispersion having particles of the disperse phase with negative charges" will be used in the broad sense to include dispersions regardless of the amount of dispersed phase. It covers both dilute suspensions, such as river water, other industrial wastes of varying amounts of disperse phase content up to digestion liquors, e.g. sulfuric acid digestion of ilmenite, where the amount of disperse phase is very large.

The polyquaternary polymers of the present invention, as is also the case with those of the Panzer and Dixon application, are of quite high molecular weight, in general substantially above 10,000. As the polymers are not single, well defined chemical compounds and it is difficult to determine molecular weights generally, the molecular weight is defined in terms of viscosity, with which it has a close correlation. Throughout the specification the viscosity will be defined by a test in aqueous solution at 25° C. and containing an amount of the polymer corresponding to 20% by weight of the polymer minus the anion. This will be referred to throughout the specification as "real organic polymer," and this expression will have no other meaning throughout the specification and claims. The reason for disregarding the anion is that weight of solids would otherwise be substantially affected by the molecular weight of the anion used, and as the effectiveness of the quaternary compounds depends on their cation rather than anion, the terminology above referred to is used so that all products can be compared on the same basis. When the product of Example 1, taken from the Nagy application, is tested under the conditions of 20% real organic polymer, its viscosity is over 200 centistokes. In tests, this product will be referred to as "Example 1." This same chemical product was used as a comparison standard in the tests in the Panzer and Dixon application so that comparative tests in the two applications are against the same standard and are, therefore, comparable, when the differences in polymer solids are taken into account.

Flocculants resembling Example 1 but not identical therewith have been described in two patents to Coscia, 3,248,353, Apr. 26, 1966, and 3,493,502, Feb. 3, 1970. The products of these two patents can be used as raw materials for quaternizing to produce the products of the present invention, and in broader aspects thereof are included, although the preferred products are those which use raw materials generally described in Example 1. It was believed by Coscia that the polymers of his two patents were essentially linear polymers. Further work has shown that these products are not completely linear but are significantly branched, and the same applies to Example 1.

There has also been described in German Auslegeschrift 1,111,144, a polyquaternary compound by the reaction of epichlorohydrin and dimethylamine. The process described is a complicated multi-step process, and there is no suggestion of using the product for flocculation of aqueous dispersions with negative charges on their disperse phase particles, much less for such dispersions which have been chlorinated, such as river water and other sources of water for human or industrial consumption. The German product is described as a dyeing assistant or as an after treatment of dyed material. While the German product was not described as a flocculant, it does have some flocculating power for aqueous dispersions although it is significantly less efficient than products of the present invention and also of the Panzer and Dixon application when tested against Example 1 as a standard.

Another proposal is to be found in the Bock and Houk Pat. 2,454,547. This product also is a polyquaternary compound prepared from epichlorohydrin and relatively long chain secondary amines, such as methyloctadecylamine. The process uses organic solvents instead of a water system and is relatively expensive. Also, the efficiency of flocculation is very markedly less than that of Example 1 or of the product of the German Auslegeschrift.

SUMMARY OF THE INVENTION

According to the present invention a reaction product of a monoalkylamine, such as a monomethylamine, and an epihalohydrin, such as epichlorohydrin, is quaternized. In other words, products of the present invention can be prepared by quaternizing Example 1, and this is the preferred raw material, although, as has been pointed out above, it is possible to quaternize products of the coscia patents, referred to above.

The present invention is not limited to any exact quaternizing procedure, and it is an advantage that any of the known quaternizing compounds, such as dimethyl sulfate, methyl chloride, similar compounds with longer alkyl chains, such as ethyl chloride, ethylene oxide or other alkylene oxides and the like, may be used. Other quaternizing agents, such as benzyl chloride are also included. It should be noted that the quaternizing agents are either esters or alkylene oxides. In the case of the esters the acids are predominantly inorganic. It should be noted that in the case of sulfuric acid esters, such as dimethyl sulfate, only the first methyl group is really active as a quaternizing agent. In other words, functionally one might consider dimethyl sulfate as a methyl ester of methyl sulfuric acid. Such an acid, however, is still predominantly inorganic, although not completely so, as is the case with chlorides.

It should be noted that since the raw materials, such as Example 1, are not completely linear polymers but show some branching of the high molecular weight polymer, this essential structure is not changed by quaternizing. When the quaternization reaction is carried out with a methylating agent, such as dimethyl sulfate or methyl chloride, the resulting polymer has an empirical formula substantially similar to the reaction products of dimethylamine and an epihalohydrin, such as epichlorohydrin. This last is one of the products of the Panzer and Dixon application, though not the preferred one. However, even though there is some similarity in the empirical formula, the product is not the same, because in the case of the present invention the polymer chain is significantly branched, whereas the polymer produced from dimethylamine and epichlorohydrin is essentially linear. When other quaternizing agents, such as ethylene oxide or higher alkylene oxides, are used, a product is produced which has quite a different chemical constitution, even in terms of empirical formula, than the reaction product of dimethylamine and epichlorohydrin described in the Panzer and Dixon application. Also, quite different compounds are produced, regardless of the nature of the quaternizing agent, than the reaction products of a mixture of secondary amines and chain extending polyamines, which is the preferred embodiment of the Panzer and Dixon application. Looking at the two applications, it should be noted that while the present invention produces products which are comparable to the best products of the Panzer and Dixon application, it produces its products by a multi-step process and not a single reaction step, as in the case of the compounds described in the Panzer and Dixon application.

The present invention may be considered as having several aspects. First, there are new products. Even when quaternization is with a compound having a methyl group, there are produced products of high viscosity. The range of viscosity can vary quite widely, in part dependent on the exact procedure of making the raw material. For the flocculation of certain dilute aqueous dispersions the viscosity may be as low as about 10 centistokes when measured as described above. Preferably, particularly for aqueous dispersions of much higher solids content, such as ilmenite digestion liquors, enzyme mashes and the like, the viscosity should be much higher, in excess of 100 centistokes. This is not an arbitrary distinction as the higher viscosity goes hand in hand with improved flocculation efficiency, and, as will be brought out below, products are obtained which are more efficient at the same level of use than Example 1.

The products of the present invention are useful for flocculating practically any water dispersion in which the disperse phase has negative charges. Typical examples are chlorinated river water, which represents a dilute suspension of very fine solids; biological mashes, which result in the various fermentation processes for producing antibiotics and enzymes; liquors from the digestion of ilmenite with sulfuric acid; waste dispersions from paper mills; municipal sewage; sewage sludge which needs to be dewatered, and the like. The above examples are only typical and of course the invention is not limited in its broader aspects to the enumerated uses.

The actual quaternizing process proceeds along well known lines and normally requires that some alkali or acid be added, during the reaction. This results in a reaction mixture in which the pH is above 6, for example from 7 to 11, depending upon the quaternizing agent used. As it is desired to have the final product near neutral, acid such as $HNO_3$ is usually employed. The final product may suitably have a pH from about 5.5 to 6.5.

It is desirable to monitor the pH continuously as it is undesirable to have this pH too high. Also, it is preferable to add the quaternizing agent at a sufficiently moderate rate so that excessive temperature does not result and the pH can be controlled. On a laboratory scale, for example, the addition may be gradual over from 60 to 200 minutes. The process is not critical so far as the amount of the quaternizing agent is concerned. Optimum results are usually obtained if there is sufficient quaternizing agent so that practically all of the nitrogen groups are quaternized, but products are included in which somewhat fewer groups are quaternized.

As flocculation efficiency requires fairly high molecular weight, which is indicated by viscosity, the original raw material must have a suitable level of viscosity before it is subjected to the process of the present invention. The products of the present invention are very efficient. They are significantly better than that of Example 1 itself. This will be brought out below in comparative tests on ilmenite digestion liquor which follow the specific examples.

BRIEF DESCRIPTION OF THE DRAWINGS

The drawing shows curves comparing the efficiency of a quaternized product of the present invention with Example 1 for the filtration of enzyme mash from the production of a proteolytic enzyme broth. The drawing shows filtration rate as an ordinate against percent of real polymer used.

DESCRIPTION OF THE PREFERRED EMBODIMENTS

In the following description in the specific examples the parts are by weight unless otherwise specified. The first example, as has been stated above, represents the standard Example 1.

Example 1

To 100 g. of methylamine (3.25 mols) dissolved in 400 g. of water in a reaction flask provided with stirrer, thermometer and reflux condenser is added 260 g. of epichlorohydrin (2.8 mols, equivalent to 0.87 mol per mol of amine) over 60 minutes, cooling (by ice bath) being applied as necessary to keep the temperature of the reaction mixture between 25° C.–40° C. at the first half of the reaction and at 50° C.–80° C. during the second half of the reaction. 160 g. of 36% aqueous sodium hydroxide solution (1.44 mols.) at 85° C. is then added to the reaction mixture. The reaction mixture is then heated to 95° C. and epichlorohydrin is added in 1 ml. ($\frac{1}{214}$ mol) portions and the viscosity of the reaction mixture is followed by filling a 6 mm. (inside diameter) vertical glass tube with the hot solution and noting the number of seconds required for the level of the solution to fall 13 inches when the bottom of the tube is opened. Results are as follows:

| Time (minutes)[1] | Ml. epi. added | Temp. (° C.) | Viscosity (seconds)[2] |
|---|---|---|---|
| 110 | 1 | 95 | 4 |
| 115 | 1 | 95 | 5.5 |
| 123 | 1 | 95 | 10.0 |

[1] From start of reaction.
[2] Of reaction mixture, by glass tube method.

After 132 minutes, the reaction mixture becomes very viscous and the viscosity continues to rise. There is then added 274 g. of cold water containing 0.8 ml. of methylamine as reaction terminator, and the reaction mixture is heated to 94° C. The following viscosity changes occur:

| Time (minutes)[1] | Temp. (° C.) | Viscosity (seconds)[2] |
|---|---|---|
| 157 | 94 | 48 |
| 220 | 94 | 90 |
| 250 | 94 | 120 |
| 310 | 94 | 136 |
| 345 | 94 | 125 |
| 605 | 94 | 60 |

[1] From start of reaction.
[2] Of reaction mixture, by glass tube method.

The decrease in viscosity after 310 minutes is caused by scission of bonds within the polymer molecule.

The reaction mixture, which has a pH of 8.7, is cooled, acidified to pH 6.3, and diluted with water. The product contains 19.3% polymer and has a viscosity of 900 centipoises at 20° C.

The solution is stable indefinitely at 70° F. and 135° F. both at pH 8.7 and 4.5.

Example 2

An aqueous dispersion of Example 1 20% real organic polymer was introduced into a reaction vessel provided with good cooling and means for constantly monitoring pH. Dimethyl sulfate and 50% sodium hydroxide were slowly and simultaneously added, maintaining the temperature between 52° and 68° C. and the pH between 7.0 and 7.8. The amount of the materials are typically 242 g. of Example 1, 83.6 g. dimethyl sulfate and 23 g. sodium hydroxide in a 50% aqueous solution.

At the start of the addition of the dimethyl sulfate and sodium hydroxide, Example 1 was warmed up to 50° C. Addition took about 45 minutes on the scale described. At the end of the addition, when the pH became constant, after 15 minutes, the reaction mixture was cooled and brought to a pH of 5.5 to 6.5 by the addition of a small amount of concentrated sulfuric acid. The product had a viscosity in excess of 300 centistokes.

Example 3

To a one liter flask equipped with Dry Ice condenser, thermometer, gas inlet, mechanical stirrer, addition funnel, and pH electrode was added 470 g. Example 1 (20.8% solids). Ethylene oxide, 80 g., was added over 5 hours while maintaining the temperature at 50°–55° C. The alkaline solution was then acidified with 50 g. 60% nitric acid. After 2 hours the pH was again adjusted to neutral with 6 g. nitric acid and the clear yellow product was cooled. The product had a viscosity of 225 centistokes at 25° C. and 25% real organic polymer solids.

Example 4

To a one liter flask equipped as before was added 451 g. Example 1 (27.3% solids). Ethylene oxide, 100 g., was added over 4 hours while maintaining the temperature at 65°–70° C. The alkaline solution was then acidified with 64 g. 60% nitric acid and cooled to 50° C. After 2 hours the pH was again adjusted to neutral with 3 g. nitric acid and the clear yellow product was cooled. The product had a viscosity of 100 centistokes at 25° C. and 33% real organic polymer solids.

Example 5

A mash from an enzyme broth of protease, from a batch produced by the Lederle Laboratories Division of American Cyanamid, was filtered by using a modified Buchner filtration test with 200 ml. broth suspension, the polymer being added diluted to 30 ml. with demineralized water. 6 g. of diatomaceous earth filter aid was finally added and all were mixed. A sample was then transferred to a 90 mm. Buchner funnel with Whatman No. 1 filter paper and a cloth support. A vacuum of 31 inches of mercury was applied and the filtrate volume was noted at 0.5 and 1.0 minutes. Various amounts of Example 1 and a quaternized product prepared according to Example 1 were added, the results being summarized in the upper curve shown in FIG. 1. It will be noted that the filtration rate for the quaternized Example 1 was somewhat more than double that of the unquaternized product at 3% dosage, the latter being illustrated by the lower curve on the drawing.

Example 6

Flocculation of ilmenite digestion liquor was tested as follows: Hot liquor at 50° C. was poured into a 1,000 ml. graduated cylinder and the particular flocculant added in the two dosages of 100 and 200 p.p.m. real organic polymer. Mixture of the flocculant was effected with a perforated metal plunger, and after 15 minutes the level of the interface between lower and supernatant phases noted. After four hours of settling, a 50 ml. sample of the supernatant was taken at the 750 ml. level in the cylinder and its turbidity measured on a photoelectric colorimeter. The sample was then diluted with deionized water at a ratio of 1:4 and its turbidity again measured. The following table shows the results:

FLOCCULATION OF ILMENITE DIGESTION LIQUOR

| Polymer | Dosage p.p.m. real organic polymer | Turb. at 4 hrs.[1] |
|---|---|---|
| Example 1 | 60 | 970 |
| Dimethyl sulfate quat—Example 2 | 50 | 600 |
| Ethylene oxide quat—Example 3 | 77 | 635 |
| Example 1 | 60 | 1,000+ |
| Methyl chloride quat | 64 | 585 |
| Dimethyl sulfate quat—Example 2 | 51 | 670 |

[1] Klett-Summerson Colorimeter readings (2 cm. light path).

It will be noted that there are slight variations from test to test. This is normal, but it will be seen that, particularly the quaternized product with dimethyl sulfate of Example 2, gives much better clarification than Example 1 even though the dosage of the flocculant was actually lower, about 50 parts of real polymer instead of 60. The table also shows very extensive flocculation even at 4 hours, the results being, for the products of the present invention, satisfactory. Speed of flocculation is a very important factor for economic flocculation because the shorter time permits much more economical utilization of equipment, an important advantage of the products of the present invention.

We claim:

1. A process for flocculating aqueous dispersions, the disperse phase having negative charges, which comprises adding to the dispersion an alkyl quaternary epihalohydrin-monoalkylamine product in which the alkyl group of said amine has less than four carbon atoms, the viscosity of the product in water solution at 25° C. and 33% real organic polymer solids being at least about 100 centistokes, said product having practically all of the nitrogen groups quaternized.

2. A process according to claim 1 in which the viscosity is greater than about 300 centistokes.

3. A process according to claim 1 in which the epihalohydrin is epichlorohydrin and the alkylamine is methylamine.

4. A process according to claim 2 in which the epihalohydrin is epichlorohydrin and the alkylamine is methylamine.

5. A process according to claim 1 in which the quaternization is by reaction with an alkylene oxide.

6. A process according to claim 1 in which the quaternizing agent is an alkyl ester.

7. A process according to claim 2 in which the aqueous dispersion is a liquor from the sulfuric acid treatment of ilmenite.

8. A process according to claim 1 in which the aqueous dispersion is an enzyme mash.

References Cited

UNITED STATES PATENTS

| 3,493,502 | 2/1970 | Coscia | 210—54 |
| 3,567,659 | 2/1971 | Nagy | 210—54 X |
| 3,240,721 | 3/1966 | Fordyce | 260—2 B P |

FOREIGN PATENTS

| 1,111,144 | 7/1961 | Germany. |

SAMIH N. ZAHARNA, Primary Examiner

T. G. WYSE, Assistant Examiner